Aug. 17, 1937.  R. H. GODDARD  2,090,038
AIRCRAFT CONSTRUCTION
Filed Oct. 17, 1934   3 Sheets-Sheet 1
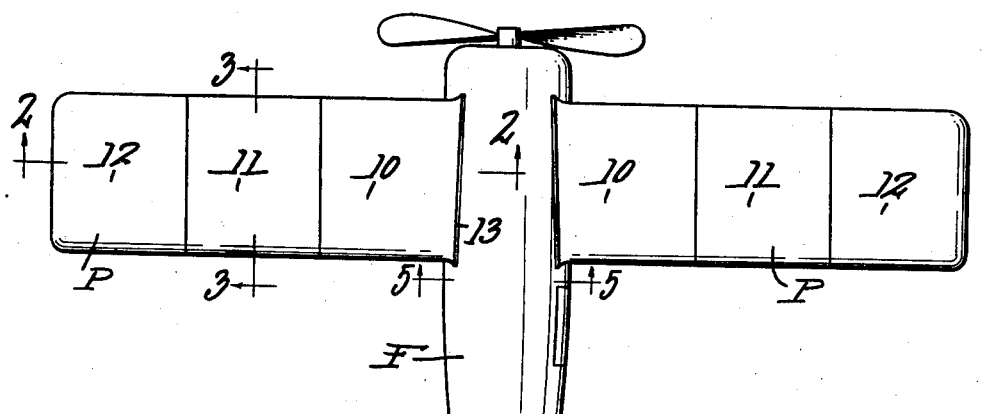
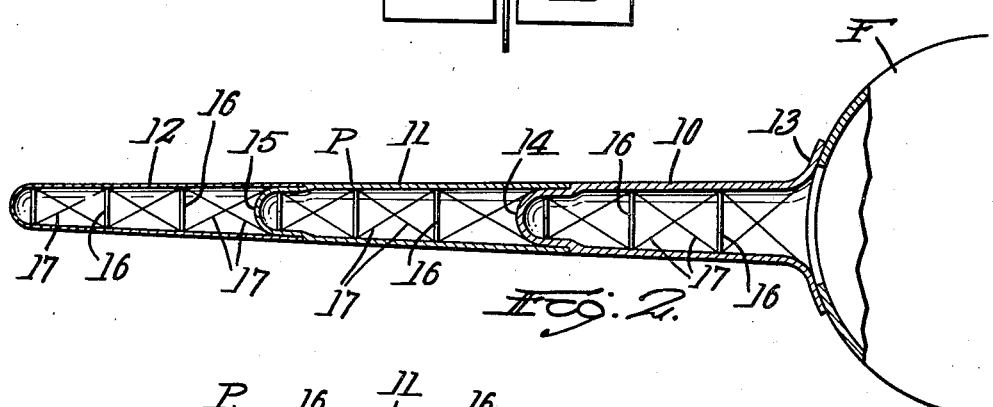
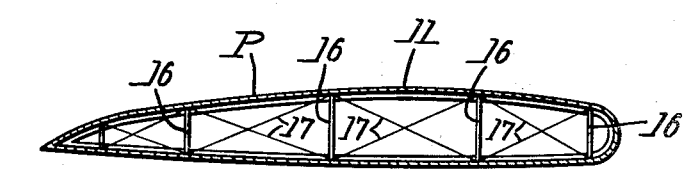
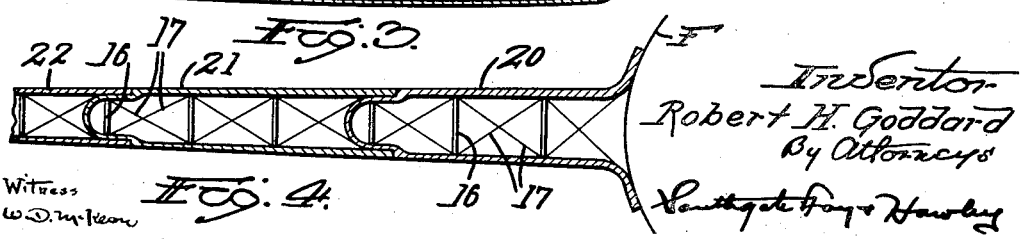
Inventor
Robert H. Goddard
By Attorneys

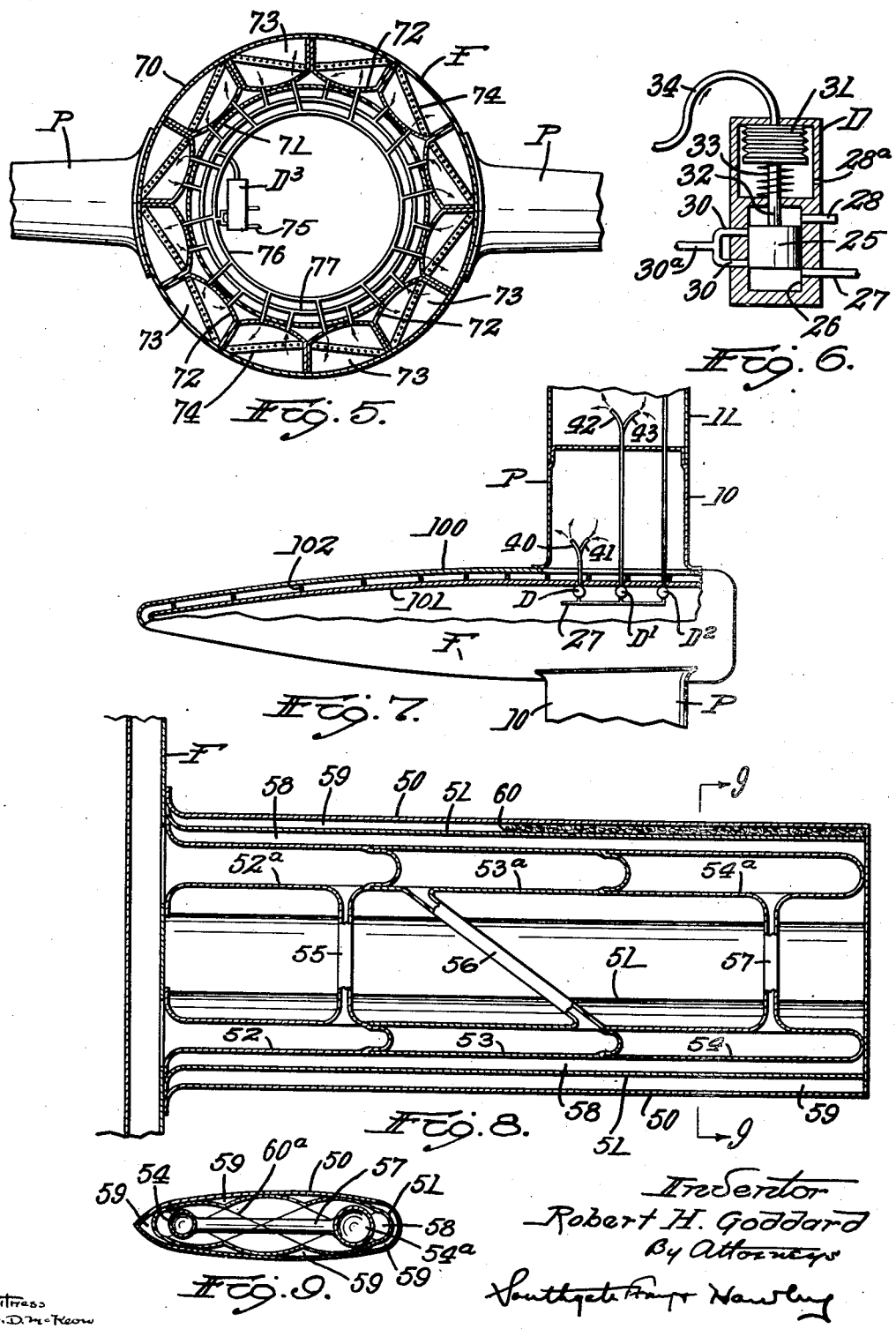

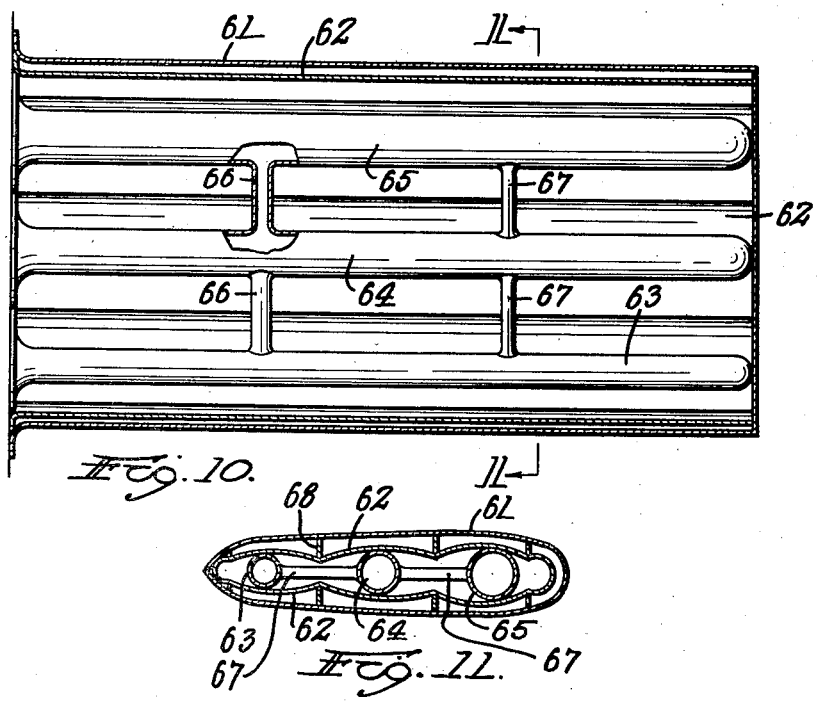
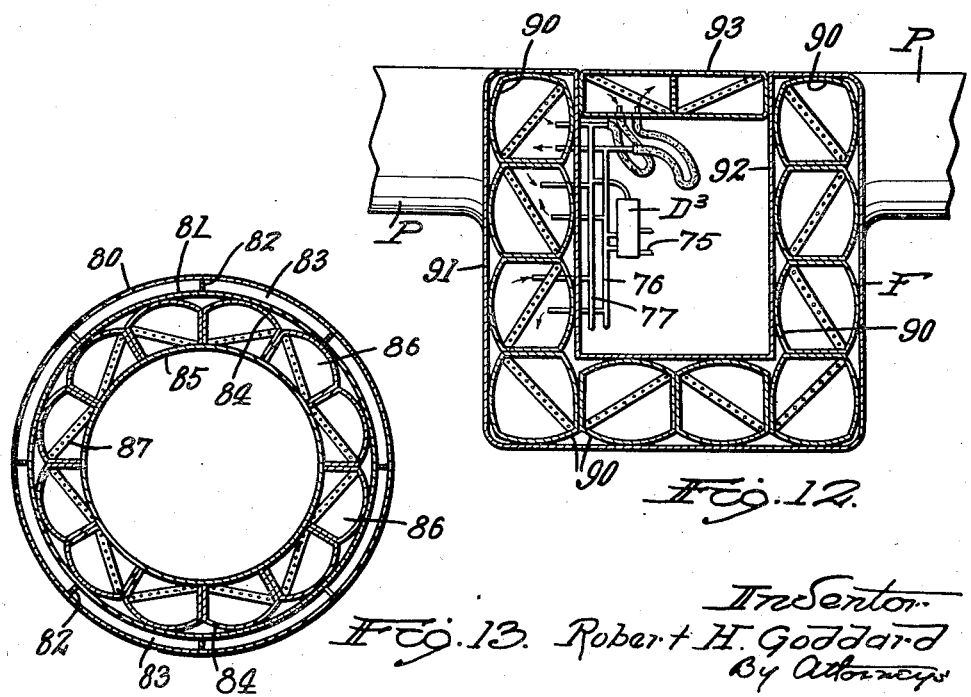

Patented Aug. 17, 1937

2,090,038

UNITED STATES PATENT OFFICE 2,090,038

AIRCRAFT CONSTRUCTION

Robert H. Goddard, Worcester, Mass.

Application October 17, 1934, Serial No. 748,654

10 Claims. (Cl. 244—123)

This invention relates generally to the construction of aircraft and more particularly to the construction of aircraft of the aeroplane type.

It is the general object of my invention to provide an improved construction for certain structural elements, such as the planes and body or fuselage of an aircraft, by which construction the strength and rigidity of said parts will be maintained or increased, while the weight of the parts may be substantially reduced.

A more specific object of my invention is to provide thin hollow structural members in an aircraft, which hollow members are maintained under substantial internal pressure and are effectively stiffened thereby.

By such construction I am able to use frame elements of very high tensile strength and of corresponding thinness, while at the same time maintaining the necessary stiffness and rigidity.

Preferred forms of my invention are shown in the drawings, in which

Fig. 1 is a plan view of an aeroplane embodying my improvements;

Fig. 2 is a partial sectional rear elevation, taken along the line 2—2 in Fig. 1;

Fig. 3 is a transverse sectional elevation, taken along the line 3—3 in Fig. 1;

Fig. 4 is a sectional view similar to Fig. 2 but showing a modified construction;

Fig. 5 is a sectional rear elevation of the body, taken along the line 5—5 in Fig. 1;

Fig. 6 is an enlarged sectional view of certain parts shown in Fig. 5;

Fig. 7 is a partial plan view, partly in section, and showing a further modification;

Fig. 8 is a sectional plan view of a plane embodying a further modification;

Fig. 9 is a transverse sectional elevation, taken along the line 9—9 in Fig. 8;

Fig. 10 is a sectional plan view of an additional modification;

Fig. 11 is a transverse sectional elevation, taken along the line 11—11 in Fig. 10;

Fig. 12 is a sectional rear elevation, showing a modified body construction, and Fig. 13 is a view similar to Fig. 12 but showing an additional modification.

Broadly speaking, my invention contemplates the use in aircraft construction of very thin sheet metal of extremely high tensile strength, and further contemplates the construction of hollow frame members or other units from such thin sheet metal and the provision of means for maintaining a substantial pneumatic or gaseous pressure within such members, whereby their stiffness is greatly increased.

In Figs. 1 to 3, I have shown an aircraft provided with planes P constructed in accordance with my invention. Each plane P is preferably formed as shown in Fig. 2 from a series of hollow sheet metal plane members 10, 11 and 12.

The member 10 preferably has an out-turned flange portion 13 by which it may be firmly secured to the body or fuselage F, and has a reduced rounded end portion 14 adapted to receive the open end of the next adjacent plane member 11. The member 11 has a similarly rounded and reduced end portion 15 to receive the open end of the outer plane member 12.

The thickness of metal in the member 11 is preferably somewhat less than in the member 10, and the thickness of metal in the member 12 is similarly less than in the member 11, the thickness of metal being greatest where the stresses are greatest.

Cross braces 16 may be provided in the different plane members 10, 11 and 12 to hold the walls of said members in definite spaced relation and these cross braces may be connected by tie wires or struts 17 which additionally stiffen the structure and prevent change in shape under internal pressure.

The plane members or compartments 10, 11 and 12 are made air and gas tight and are maintained under substantial internal pressure, as will be hereinafter described. This application of internal pressure substantially stiffens the thin metal structure and imparts greatly increased rigidity thereto. Preferably the pressure in the member 11 is less than in the member 10, and the pressure in the member 12 is less than in the member 11.

An aircraft plane thus constructed is well adapted to utilize the extremely high tensile strength of certain very thin sheet metals, and the weight of the aircraft may be correspondingly reduced.

In Fig. 4, I have shown a similar construction, except that the thickness of metal in each plane member 20, 21 and 22 is not only of less thickness than its inwardly adjacent section, but is also gradually reduced in thickness toward the outer end of each section. With this construction, considerable additional reduction in weight may be obtained without corresponding reduction in strength.

The desired internal pressure may be secured by admitting compressed air to the different plane members, or by the use of lighter compressed gases, such as hydrogen or helium, where a greater saving in weight is desired.

The air or gas under pressure may be supplied from a pump or other supply source carried by the aircraft, and a differential valve is preferably provided for each plane member or pressure compartment. These valves may be of any usual or commercial form and such a valve is shown conventionally in Fig. 6, in which a piston 25 is mounted in a cylinder 26 having a port 27 connected to a supply of air or other gas under pressure, a port 28 connected to the atmosphere, and spaced ports 30 connected through a pipe 30a to a plane member or compartment to be maintained under pressure.

A bellows device 31 is connected to one end of the piston rod 32 on which the piston 25 is mounted, and a spring 33 tends to close the bellows and to move the piston 25 upward. A pipe 34 connects the bellows 31 to the interior of the plane member or pressure compartment, and a port 28a preferably connects the space outside the bellows 31 with the atmosphere.

With this construction, air or gas under pressure will be admitted through the lower port 30 to the compartment until the air pressure therein, communicated through the pipe 34 and bellows 31, overcomes the spring 33 and moves the piston 25 to a position in which the lower port 30 is closed. If the air pressure in the compartment increases relative to atmospheric pressure, due to the ascent of the plane to a high altitude, to a rise in temperature, or to any other cause, the piston 25 will be forced downward, connecting the upper port 30 to the atmosphere and thus relieving the pressure.

In Fig. 7, I have indicated the necessary connections for maintaining different air pressures in the different plane members 10, 11 and 12. The supply pipe 27 is connected through a differential valve D to pipes 40 and 41 in the plane members or compartments 10, said pipes corresponding to the pipes 30a and 34 in Fig. 6. The pipe 27 is connected through a second differential valve D' to pipes 42 and 43 leading to the pressure compartment or plane member 11, and a third differential valve D² is connected by similar pipes to the end compartment or plane member 12. In this way predetermined pressures may be maintained in each of the plane members or pressure compartments.

A modified plane construction is shown in Figs. 8 and 9 in which the plane is constructed with an outer streamline shell or casing 50 sustaining relatively low pressure, an inner non-streamline casing 51 sustaining considerable pressure, and tubular inner members 52 and 52a, 53 and 53a and 54 and 54a, sustaining a relatively high pressure. These tubular members are preferably joined together in pairs by cross tubes or connections 55, 56 and 57, and the two members of each pair are preferably of different diameters, as indicated at 54 and 54a in Fig. 9, the difference in diameter being adopted to permit the desired streamline contour of the plane.

The parts 52, 53 and 54 and 52a, 53a and 54a are secured together by providing reduced end portions fitting the open ends of adjacent portions, all as previously described, and the walls of said members may be of decreased or tapered cross section, also as previously described.

Air connections as shown in Fig. 7 are provided to the different plane members and also to the space 58 within the casing 51, and to the space 59 between the inner and outer casings. The tubular members are adapted to withstand very substantial pressures, preferably greatest in the members 52—52a, since these tubular members can withstand relatively great pressures without undergoing change of shape, while a somewhat reduced pressure will be provided in the space 58 and a still further reduced pressure in the outer space 59, as stated above.

Pressure in all of these members tends to stiffen the same and permits the use of relatively thin sheet metal of high tensile strength in their construction. The space between the outer casing 50 and inner casing 51 may be packed with some suitable porous material 60 (Fig. 8), such as kapok, to prevent distortion of the streamline surface which might be produced by the non-streamline form of the inner surface 51 if the pressure within the casing 50 should be too much reduced or in the event of puncture of the outer casing. Tie wires or braces 60a (Fig. 9) may be used for additional protection against distortion.

A further plane construction is shown in Figs. 10 and 11 in which the plane is provided with an outer casing 61, an inner casing 62 and tubular members 63, 64 and 65, each extending the full length of the plane. The tubular members 63, 64 and 65 are preferably connected by cross tubes 66 and 67, and air or gas at a predetermined pressure is maintained therein through suitable supply mechanism such as has been previously described.

Partitions 68 extend lengthwise between the inner and outer casings 62 and 61, maintaining these parts in spaced relation and also providing a series of additional longitudinally extending compartments in which air or gas under pressure may be maintained. Air pressure is also provided within the inner casing 62.

The pressure may be graduated as previously described, the highest pressure being maintained in the tubular members, a somewhat lower pressure within the inner casing 62 and a still lower pressure in the compartments between the inner and outer casings 62 and 61.

This construction is somewhat more simple than that shown in Figs. 8 and 9 but possesses many of the advantages thereof.

In Fig. 5, I have shown an adaptation of my invention to the construction of a body or fuselage of circular cross section. In this construction, an outer casing 70 is provided, also an inner casing 71 and a plurality of frame members 72 assembled between the inner and outer casings and providing a series of air compartments 73. The members 72 are welded or otherwise secured to the inner face of the outer casing 70 to form air-tight joints therewith.

Perforated partitions 74 may be provided in the compartments 73 for additional stiffness if so desired or wire tie rods may be used. Suitable provision, such as a supply pipe 75, differential valve D³, distributing pipe 76, and control pipe 77, will be made by which a desired pressure may be maintained in each of the compartments 73.

The provision of substantial pressure within the compartments 73 has the same effect of increasing the strength and rigidity of the relatively thin sheet metal elements in the fuselage as has been previously described in connection with plane construction.

A modified body or fuselage construction is shown in Fig. 13 in which an outer casing 80 and intermediate casing 81 are spaced apart by braces or partitions 82 to form a series of pressure compartments 83. Sectional members 84 are mounted within the intermediate casing 81 and cooperate with an inner casing 85 to form a series of pressure compartments 86.

Perforated partitions or braces 87 may be provided to stiffen the compartments 86 or wire tie rods may be used. The compartments 83 and 86 will be maintained under predetermined pressures, as previously described, with the pressure in the compartments 83 substantially reduced relative to the pressure in the compartments 86.

In Fig. 12, I have shown the adaptation of my invention to a body or fuselage of rectangular construction. In this case a plurality of pressure compartments 90 are assembled between an outer casing 91 and an inner casing 92, and the usual provision is made for maintaining air or gas pressure within said compartments.

A door 93 may also be provided which may be formed of similar air compartments and maintained under similar pressure.

In Fig. 7 the body or fuselage is shown as comprising an outer wall 100 and an inner wall 101 separated by cross braces or partitions 102 to form pressure compartments which are maintained at predetermined pressure by suitable air or gas supplying means.

The thickness of metal in a fuselage thus constructed will preferably gradually decrease toward the rear end, as the stresses are correspondingly decreased.

Having thus disclosed several embodiments of my invention, it will be seen that by the use of thin sheet metal structural members under internal pressure, I am able to maintain or increase the structural strength and rigidity of an aircraft, while at the same time substantially reducing the weight and correspondingly increasing the load-carrying capacity.

Having thus described my invention and the advantages thereof, I do not wish to be limited to the details herein disclosed, otherwise than as set forth in the claims, but what I claim is:—

1. In an aircraft, a plane formed of successive gas-tight compartments, and means to maintain pressures in predetermined excess of atmospheric in said compartments, the outer end of each compartment being rounded to resist internal pressure and fitting within and closing the open inner end of the next compartment.

2. In an aircraft, a plane formed of successive gas-tight compartments, and means to maintain pressures in predetermined excess of atmospheric in said compartments, the walls of said compartments being formed of thin high-tensile sheet metal, and the metal in each compartment being progressively reduced in thickness toward its outer end.

3. In an aircraft, a plane comprising a gas-tight metal casing, tubular metal stiffening members for said casing, means to maintain internal pressure in excess of atmospheric in said casing, and means to maintain a substantially greater pressure in said tubular members.

4. In an aircraft, a member having an outer streamline casing, an inner casing, devices forming pressure compartments within said inner casing, and means to maintain selected pressures in said compartments and within said inner and said outer casings, all of which pressures are in predetermined excess of atmospheric.

5. In an aircraft, a member having an outer streamline casing, an inner non-streamline casing capable of resisting substantial internal pressure, devices forming pressure compartments within said inner casing, means to maintain predetermined pressures in said compartments and within said inner and said outer casings, and a porous and flexible packing material filling the space between said inner and outer casings.

6. In an aircraft, a member having an outer streamline casing, an inner casing, devices forming pressure compartments within said inner casing, means to maintain predetermined pressures in said compartments and within said inner and said outer casings, and a porous and flexible packing material filling the space between said inner and outer casings.

7. In an aircraft, a structural member formed of thin high-tensile sheet metal and comprising a plurality of gas-tight compartments each maintained under substantial internal pressure, and pressure-regulated mechanism effective to automatically maintain different pressures in excess of atmospheric in different compartments which are proportionate to the stresses to be resisted thereby.

8. In an aircraft, a plane formed of longitudinally successive air-tight compartments and pressure-regulating mechanism effective to automatically maintain different pressures in different successive compartments, each pressure being in predetermined excess of atmospheric.

9. In an aircraft, a plane formed of longitudinally successive air-tight compartments and pressure-regulating mechanism effective to automatically maintain different pressures in different successive compartments, each pressure being in predetermined excess of atmospheric and said pressures progressively decreasing toward the outer end of each plane.

10. In an aircraft, a plane comprising a casing, a pair of tubular members within said casing extending substantially the entire length thereof, cross tubes opening into and connecting said tubular members at a plurality of points, means to provide substantial internal pressure in excess of atmospheric within said members and cross tubes, and means to provide a reduced pressure but also in excess of atmospheric in the space between said members and casing.

ROBERT H. GODDARD.